Jan. 19, 1943.  A. FRANZ ET AL  2,308,913
REINFORCING EXHAUST CONDUITS
Filed July 6, 1939
Fig. 1
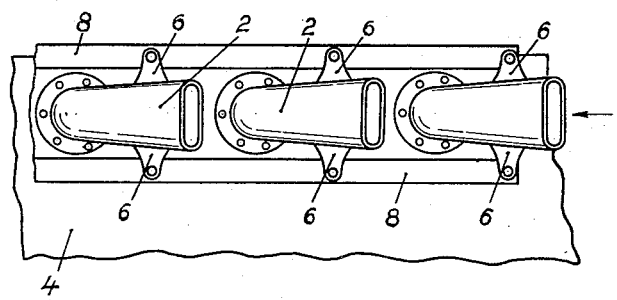
Fig. 2
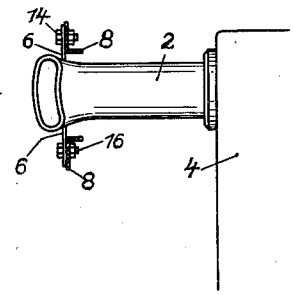
Fig. 3
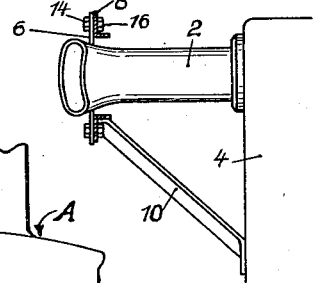
Fig. 4
Fig. 5
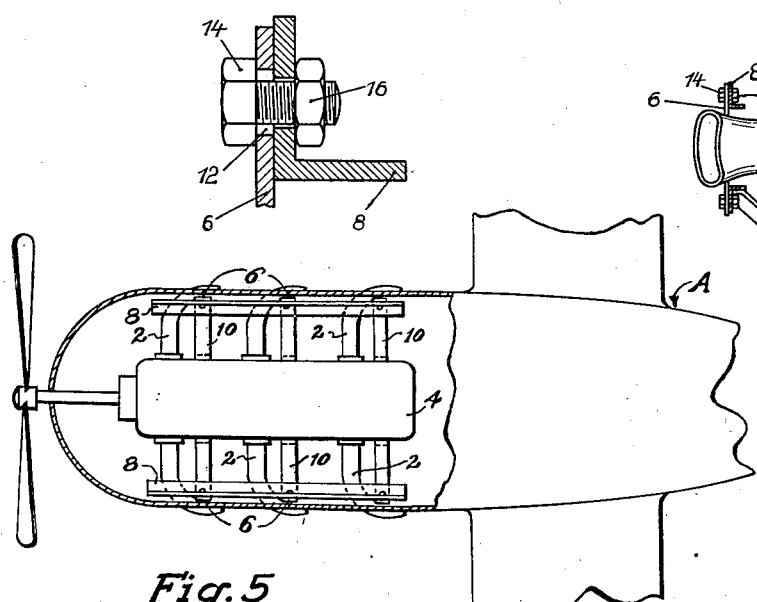
Inventors:
Anselm Franz,
Siegfried Decher,
Bailey & Carson
Attorneys Patented Jan. 19, 1943

2,308,913

UNITED STATES PATENT OFFICE 2,308,913

REINFORCING EXHAUST CONDUITS

Anselm Franz, Dessau, and Siegfried Decher, Dessau-Siedlung, Germany; vested in the Alien Property Custodian Application July 6, 1939, Serial No. 283,102
In Germany July 9, 1938

6 Claims. (Cl. 60—35.6)

This invention is directed to the reinforcement of a plurality of exhaust conduits projecting from the cylinders of an aircraft engine in the form of nozzles for the purpose of ejecting the exhaust gases to produce a recoil action for aiding in the forward propulsion of an aircraft.

Because of the high velocities and forces developed in these nozzle-shaped conduits in order to obtain the recoil action, the conduits are likely to warp and break under the stress. Particularly stress is caused by vibration, and such vibration can cause breakage of the conduits so that the same may perhaps be, in effect, exploded, and thus cause damage to adjacent portions of the aircraft by reason of flying broken parts.

It is an object of this invention to reinforce the conduits to mitigate the chances of their failure through vibration.

A further object of the invention is to reinforce a row of individual conduits extending from the combustion chambers of an engine by connecting these conduits together.

Another object of the invention is to damp the natural frequency of vibration of the conduits by connecting them together, and, if desired, further connecting them to a mass not subject to the vibrations produced in the individual conduits.

Another object of the invention is to connect the individual exhaust conduits and the reinforcing elements so that allowance is made for expansion and distortion of the conduits relative to the reinforcing elements.

Generally these objects of the invention are obtained by connecting reinforcing elements to each exhaust conduit in a row of conduits. These reinforcing elements can be further connected to the engine block or other mass not vibrated by the conduits.

The means by which the objects of the invention are obtained are more fully described in the accompanying specification taken in connection with the drawing, in which:

Fig. 1 is a side elevational view of a plurality of exhaust conduits joined together by reinforcing means.

Fig. 2 is a side view of Fig. 1.

Fig. 3 is an enlarged cross-sectional view of the joint connecting an exhaust conduit to the reinforcing means.

Fig. 4 is a view similar to Fig. 2 showing in addition a reinforcing strut secured to the engine block, and Fig. 5 is a diagrammatic view of an airplane illustrating the invention applied thereto.

In Fig. 1 a plurality of individual exhaust conduits 2 are shown projecting from an engine block 4, each of the conduits of course being connected to the exhaust port of the individual combustion chambers. These conduits are in the form of nozzles which project toward the rear of the aircraft and form recoil nozzles which aid in the forward propulsion of the aircraft by reason of the recoil effect produced by the gas emitted from the nozzles. These nozzles are subject to severe vibration by the gases passing therethrough. Flanges 6 are welded or otherwise secured to opposite sides of each conduit, and reinforcing bars 8 extending alongside of a plurality of nozzles are secured to the flanges. As shown in Fig. 2, each nozzle is thus reinforced adjacent its outer end, this being the position where the natural and greatest vibration occurs. As the frequency of the vibrations and the period of vibration of each nozzle differs from adjacent nozzles, the connecting of the various nozzles together causes an effective dampening of the vibrations which would take place in each individual nozzle, and a possibility of entirely suppressing the vibrations.

In addition to this reinforcing means, the reinforcing bars 8 can be connected through a strut 10 to the cylinder block as shown in Figs. 4 and 5. Similarly, the strut can be connected to any other part of the mass of the aircraft A which is not vibrated by the nozzles 2, thus dampening the vibrations against such mass.

Reinforcing bars 8 are shown in Figs. 2 and 3 as being composed of angle irons. This structural form provides rigidity as well as strength. Obviously other shapes, such as tubular shapes, could be employed.

As the exhaust conduits 2 expand when heated, it is desirable to allow for relative movement between the flanges 3 and the reinforcing bars 8. Consequently, as shown in Fig. 3, flange 6 is slotted at 12, through which slot a bolt 14 is passed. Bolt 14 is secured by a nut 16 which bears against a face of the angle bar 8. As shown in Fig. 4, the strut 10 can be secured to the angle bar 8 by means of the same bolt 14.

Having now described a means by which the objects of this invention may be obtained, what we claim and desire to secure by Letters Patent is:

1. In an internal combustion engine, a plurality of exhaust conduits in the form of independent recoil producing nozzles, a reinforcing element extending beside and common to said nozzles, and means for connecting each nozzle to said element to effect a vibration dampening, while permitting thermal expansion, therebetween.

2. In an internal combustion engine, a plurality of exhaust conduits in the form of independent recoil producing nozzles, a pair of reinforcing elements extending along opposite sides of said nozzles, and means for connecting each nozzle to said elements to effect a vibration dampening, while permitting thermal expansion, therebetween.

3. In an internal combustion engine, a plurality of exhaust conduits in the form of independent recoil producing nozzles, a flange secured to each nozzle adjacent an end thereof, and reinforcing means joining each flange to the flanges of the other nozzles to effect a vibration dampening, while permitting thermal expansion, therebetween.

4. In an internal combustion engine, a plurality of exhaust conduits in the form of independent recoil producing nozzles, a flange secured to each nozzle, a slot in each flange, a reinforcing bar common to the flanges secured to said nozzles, and fastening means extending through said slots for adjustably securing said flanges to said bar.

5. In an internal combustion engine, a plurality of exhaust conduits in the form of independent recoil producing nozzles, a reinforcing element extending beside and common to said nozzles, and relatively movable connecting means securing each nozzle to said element for permitting thermal expansion of said nozzles while dampening vibrations of said nozzles.

6. In an internal combustion aircraft engine, a plurality of individual exhaust conduits extending from the engine with their free ends directed toward the rear of the engine to form recoil nozzles, a member, means connecting said member to each nozzle for permitting relative thermal expansion between each nozzle and said member, and said member being attached to each nozzle adjacent the free end of the nozzle at substantially the position where the greatest vibration is produced by the exhaust gases passing through the nozzle whereby the vibration in any one nozzle is damped by the different period of vibrations occurring in the connected nozzles.

ANSELM FRANZ.
SIEGFRIED DECHER.